(12) United States Patent
Kalwani et al.

(10) Patent No.: US 11,790,591 B2
(45) Date of Patent: Oct. 17, 2023

(54) GRAPHICS PROCESSOR HEALTH PREDICTIONS

(71) Applicant: Hewlett-Packard Development Company, L.P., Spring, TX (US)

(72) Inventors: Manohar Lal Kalwani, Pune (IN); Abhishek Ghosh, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 89 days.

(21) Appl. No.: 17/577,742

(22) Filed: Jan. 18, 2022

(65) Prior Publication Data
US 2023/0129649 A1   Apr. 27, 2023

(51) Int. Cl.
*G06T 15/00* (2011.01)
*G06N 20/00* (2019.01)
*G06F 11/07* (2006.01)

(52) U.S. Cl.
CPC ........ *G06T 15/005* (2013.01); *G06F 11/0721* (2013.01); *G06N 20/00* (2019.01)

(58) Field of Classification Search
None
See application file for complete search history.

(56) References Cited

U.S. PATENT DOCUMENTS

| 8,645,760 | B2 | 2/2014 | Van Gilluwe | |
|---|---|---|---|---|
| 2011/0154309 | A1* | 6/2011 | Sazegari | G06F 11/3062 719/331 |
| 2016/0328281 | A1 | 11/2016 | Lee | |
| 2019/0138314 | A1 | 5/2019 | Geigel | |
| 2019/0147364 | A1* | 5/2019 | Alt | G06N 7/01 706/12 |
| 2020/0090001 | A1* | 3/2020 | Zargahi | G06V 10/774 |
| 2022/0206873 | A1* | 6/2022 | He | G06F 9/4881 |
| 2022/0269537 | A1* | 8/2022 | Samuel | G06F 11/302 |
| 2022/0365586 | A1* | 11/2022 | Kim | G06F 1/324 |
| 2023/0029920 | A1* | 2/2023 | Gatson | G06F 9/5077 |
| 2023/0122697 | A1* | 4/2023 | Maddukuri | G06F 1/324 713/300 |
| 2023/0123999 | A1* | 4/2023 | Ballard | G06F 15/177 713/1 |
| 2023/0229513 | A1* | 7/2023 | Zargahi | G06F 18/217 706/12 |

OTHER PUBLICATIONS

Inal, G., et al. : "Application of Machine Learning Techniques on Prediction of Future Processor Performance", IEEE, Dec. 31, 2018, pp. 190-195.
Roberto, M., "Machine Learning on Telemetry Data: Mining Value from Chaos", Aug. 9, 2019, pp. 3.

* cited by examiner

*Primary Examiner* — Frank S Chen
(74) *Attorney, Agent, or Firm* — Knobbe, Martens, Olson & Bear, LLP

(57) ABSTRACT

In an example, a non-transitory machine-readable storage medium storing instructions executable by a processor of a computing device to receive device telemetry data associated with an electronic device. The device telemetry data may include data that affects a performance of a graphics processor of the electronic device. Further, instructions may be executed by the processor to predict health of the graphics processor by applying a machine learning model to the device telemetry data. Furthermore, instructions may be executed by the processor to generate an alert notification based on the predicted health of the graphics processor.

15 Claims, 6 Drawing Sheets

GRAPHICS PROCESSOR HEALTH PREDICTIONS

BACKGROUND

Rapid advances in electronics and communication technologies, driven by immense customer demand, have resulted in the worldwide adoption of devices that display a wide variety of video content and graphics. Examples of such electronic devices may include smartphones, computers, workstations, game consoles, and similar digital processing devices. As the electronic devices have advanced, the electronic devices augment the processing capabilities of a general-purpose central processing unit (CPU) with a specialty processor, such as a graphics processing unit (GPU) or a graphics processor. The GPU is a graphics and video rendering device designed to handle processing of complex mathematical and geometric calculations, e.g., for graphics rendering. The GPU may be implemented as a co-processor component to the CPU of the electronic devices. Further, the GPU may be provided in the form of an add-in card (e.g., a video card), co-processor, or as functionality that is integrated directly into a motherboard of the electronic devices or into other devices (such as, for example, Northbridge devices and CPUs). As a result, GPUs may be capable of executing both graphics processing and more general computing tasks.

BRIEF DESCRIPTION OF THE DRAWINGS

Examples are described in the following detailed description and in reference to the drawings, in which.

DETAILED DESCRIPTION

Figure 1:
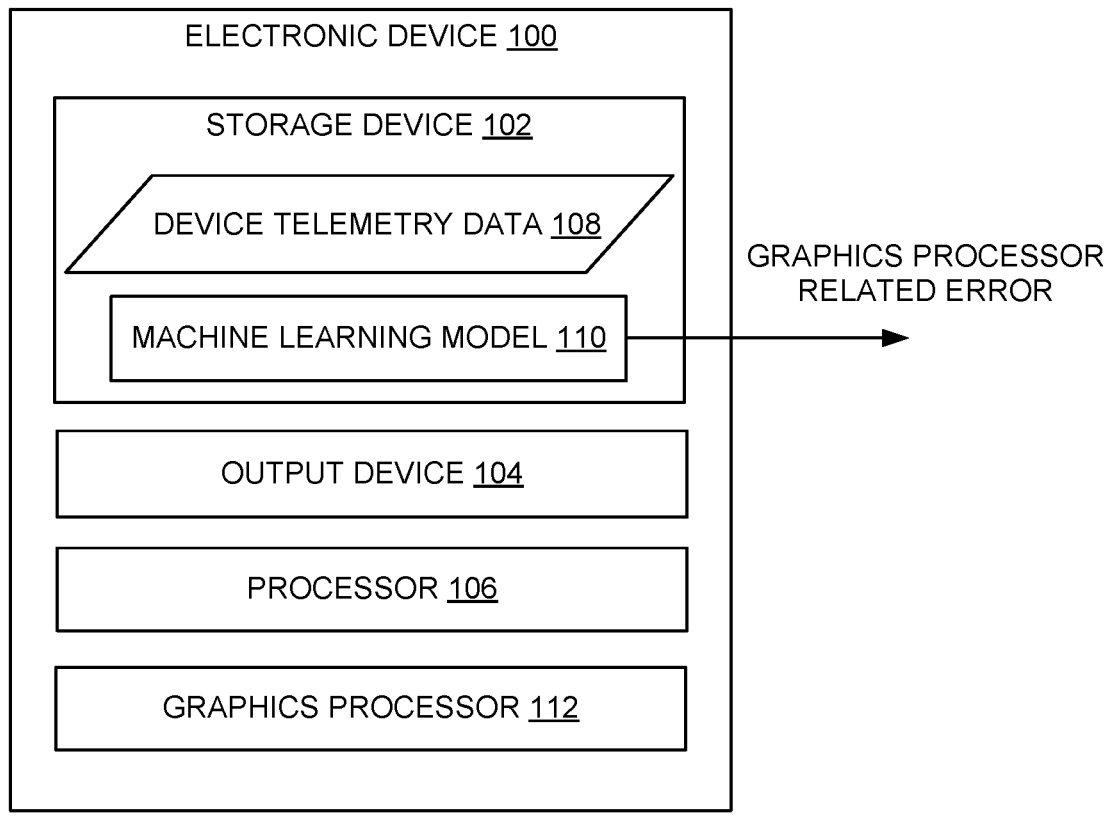
FIG. 1 is a block diagram of an example electronic device, including a processor to output an alert notification including a corrective action to mitigate a graphics processor related error.

Electronic devices, such as desktop computers, laptop computers, point of sale systems, smart phones, or the like may include a graphics processing unit (GPU) or a graphics processor to augment processing capabilities of a general-purpose central processing unit (CPU) of the electronic devices. The terms "graphics processor" and "GPU" are used interchangeably throughout the document. A graphics processor may be a display adapter or video card within an electronic device's motherboard or installed and connected to the motherboard externally. The graphics processor may be capable of rendering graphics for display on electronic devices.

Graphics processor related errors may cause the electronic devices to periodically malfunction, for instance, while playing games. An example GPU related error may include a single bit error, a double bit error, a display engine error, an error programming video memory interface, or the like. Various reasons such as poor ventilation, device overheating, dead graphics processor fans, blown capacitors, outdated drivers, insufficient memory, applications installed/usage, insufficient power supply to the graphics processor, and the like may result in such graphics processor related errors and also cause failure of the graphics processor. Due to the failure of the graphics processor, performance of the electronic devices may be significantly affected causing distorted visuals or weird patterns displayed on a display panel of the electronic devices, periodic driver crashes, a loud noise made by the fans, black screen, blue screen appearing during gaming, unexpected system reboots, freezing/hanging/crashing of the electronic devices, and the like.

Examples described herein may provide a cloud computing device that utilizes a machine learning model to predict health of a graphics processor of an electronic device and generate an alert notification including a recommended action to mitigate an impact of a device condition on the health of the graphics processor. The computing device may be a server that is communicatively connected to the electronic device via a network.

In an example, the computing device may obtain historical device telemetry data associated with the electronic device. The device telemetry data may include data that affects a performance of the graphics processor. Further, the computing device may process the historical device telemetry data to generate a train dataset and a test dataset. Furthermore, the computing device may build a set of machine learning models with the train dataset to determine the health of the graphics processor. Also, the computing device may test the trained set of machine learning models with the test dataset. Further, the computing device may select a machine learning model having a maximum accuracy from the set of trained and tested machine learning models to predict the health of the graphics processor.

During operation, the computing device may receive real-time device telemetry data associated with the electronic device. Further, the computing device may predict the health of the graphics processor by applying the selected machine learning model to the real-time device telemetry data. Furthermore, the computing device may send an alert notification (e.g., including a corrective action to mitigate graphics processor related errors) to the electronic device based on the predicted health of the graphics processor.

Thus, examples described herein may collect the device telemetry data and utilize the machine learning model to predict the graphics processor related errors. Further, examples described herein may prompt users with details of the underlying graphics processor related errors and also prompt the users with the corrective actions to proactively address the graphics processor related errors. Thus, examples described herein may intelligently identify and predict aforementioned issues with the graphics processor, which may avoid a failure of the graphics processor or the electronic device.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1 is a block diagram of an example electronic device 100, including a processor 106 to output an alert notification including a corrective action to mitigate a graphics processor related error. Example electronic device 100 is a desktop computer, a notebook computer, a tablet computer, a smartphone, a game console, or the like.

As shown in FIG. 1, electronic device 100 includes a storage device 102, output device 104, processor 106, and graphics processor 112. As used herein, the term "processor" may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 106 may, for example, include single or multiple cores on a chip, multiple cores across multiple chips, multiple cores across multiple devices, or suitable combinations thereof. Processor 106 may be functional to fetch, decode, and execute instructions as described herein. Further, graphics processor 112 may be a specialized electronic circuit designed to manipulate and alter memory of electronic device 100 to generate a feed of images intended for display via output device 104 (e.g., a display device).

Storage device 102 may store device telemetry data 108 associated with electronic device 100. In an example, device telemetry data 108 includes graphics processor related data, application usage data, error checking and correcting (ECC) error data, and the like. For example, the graphics processor related data includes graphics processor usage data (e.g., data indicating an amount of graphics processor resources used by electronic device 100 or an amount of work handled by graphics processor 112), graphics processor identification data (e.g., data indicating dimensional data, name, manufacturer, year of make, and the like of graphics processor 112), graphics processor temperature data (e.g., data indicating temperature of graphics processor 112), graphics processor settings data (e.g., data indicating a current graphics setting for which data is collected in electronic device 100), graphics processor driver data, or any combination thereof.

Further, the application usage data may include data indicating frequently used applications and track a number of concurrent applications during user sessions. The ECC error data may include single bit ECC error data, double Bit ECC Error data, or a combination thereof. For example, an ECC may allow electronic device 100 to detect when memory errors (e.g., single bit ECC errors or double bit ECC errors) occur. The ECC may correct the single bit ECC errors and detect the double bit ECC errors, which can cause applications to crash. The occurrences of the single bit ECC errors and the double bit memory errors may be recoded and stored in storage device 102.

Further, storage device 102 includes a machine learning model 110. In an example, machine learning model 110 may be trained and tested using historical device telemetry data to determine a condition of electronic device 100 that may trigger a graphics processor related error. In such examples, machine learning model 110 may be trained and tested in a server (e.g., a cloud-based server, Software as a Service (SaaS)-based server, or the like). Further, electronic device 100 may receive trained and tested machine learning model 110 from the server.

The "machine-learning model" may refer to a computer representation that can be tuned (e.g., trained) based on inputs to approximate unknown functions. In particular, the term "machine-learning model" can include a model that utilizes methods to learn from, and make predictions on, known device telemetry data by analyzing the known device telemetry data to learn to generate an output (e.g., the graphics processor related errors) that reflect patterns and attributes of the known device telemetry data. For example, the machine learning model may be a supervised machine learning model that implements a classification method such as a random forest, XG boost, logistic regression, or the like. In other examples, the machine-learning model can include, but not limited to, a decision tree, support vector machine, Bayesian network, dimensionality reduction algorithm, artificial neural network, and deep learning. Thus, the machine-learning model makes high-level abstractions in the device telemetry data by generating data-driven predictions or decisions from the inputted device telemetry data. In other examples, device telemetry data 108 and machine learning model 110 can be stored in separate storage devices associated with electronic device 100.

During operation, processor 106 may retrieve stored device telemetry data 108 for a period in response to receiving a trigger event (e.g., a user login event). Further, processor 106 may apply machine learning model 110 to device telemetry data 108 to determine a condition of electronic device 100 that triggers the graphics processor related error. In an example, processor 106 may correlate, in time-series, the graphics processor data, application usage data, and ECC error data. Further, processor 106 may determine the condition of electronic device 100 that triggers the graphics processor related error by applying machine learning model 110 to device telemetry data 108 based on the correlation. For example, the graphics processor related error may include a single bit ECC error, a double Bit ECC Error, a temperature of graphics processor 112 exceeding a threshold, or any combination thereof.

Further, processor 106 may retrieve a corrective action corresponding to the determined condition to mitigate the graphics processor related error when the determined condition indicates the graphics processor related error. Furthermore, processor 106 may output an alert notification including the corrective action via output device 104. In an example, processor 106 may output the corrective action via a defined policy. An example alert notification may include, but not limited to, a visual alert outputted via a visual output device (e.g., a display device), an audible alert outputted via a speaker, a haptic alert outputted via a tactile feedback device (e.g., a vibrator), data that can be sent via a communication interface to an external monitoring device, or any combination thereof. An example recommended action may include a suggestion to close an active application (e.g., to reduce load), to power off electronic device 100, to replace a component, upgrade a graphics processor driver, upgrade memory, upgrade an operating system, replace the graphics processor, and the like.

Figure 2:
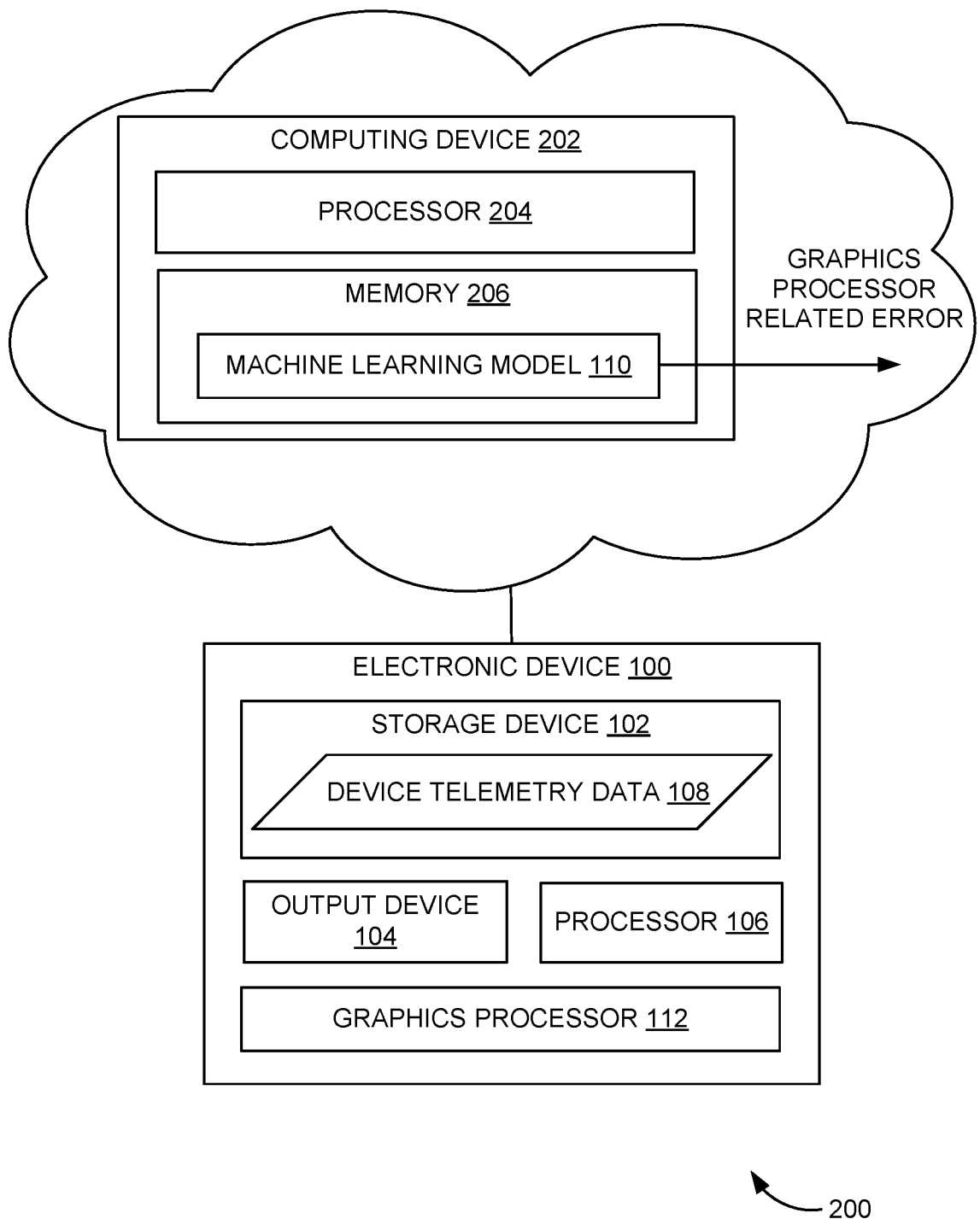
FIG. 2 is a block diagram of an example computing environment, depicting the example electronic device of FIG. 1 in communication with a computing device.

FIG. 2 is a block diagram of an example computing environment 200, depicting example electronic device 100 of FIG. 1 in communication with a computing device 202. For example, similarly named elements of FIG. 2 may be similar in structure and/or function to elements described with respect to FIG. 1. In the example shown in FIG. 2, machine learning model 110 may be implemented as part of computing device 202. Example computing device 202 may be a cloud-based server. Further, computing device 202 includes a processor 204 and a memory 206. In the example shown in FIG. 2, memory 206 includes machine learning model 110.

During operation, computing device 202 may receive device telemetry data 108 from electronic device 100. Further, processor 204 may apply machine learning model 110 to received device telemetry data 108 to determine a condition of electronic device 100 that triggers the graphics processor related error and retrieve a corrective action corresponding to the determined condition to mitigate the graphics processor related error.

Further, processor 204 may send an alert notification including the corrective action to electronic device 100. In this example, processor 106 of electronic device 100 may receive the alert notification and output the alert notification via output device 104.

Figure 3A:
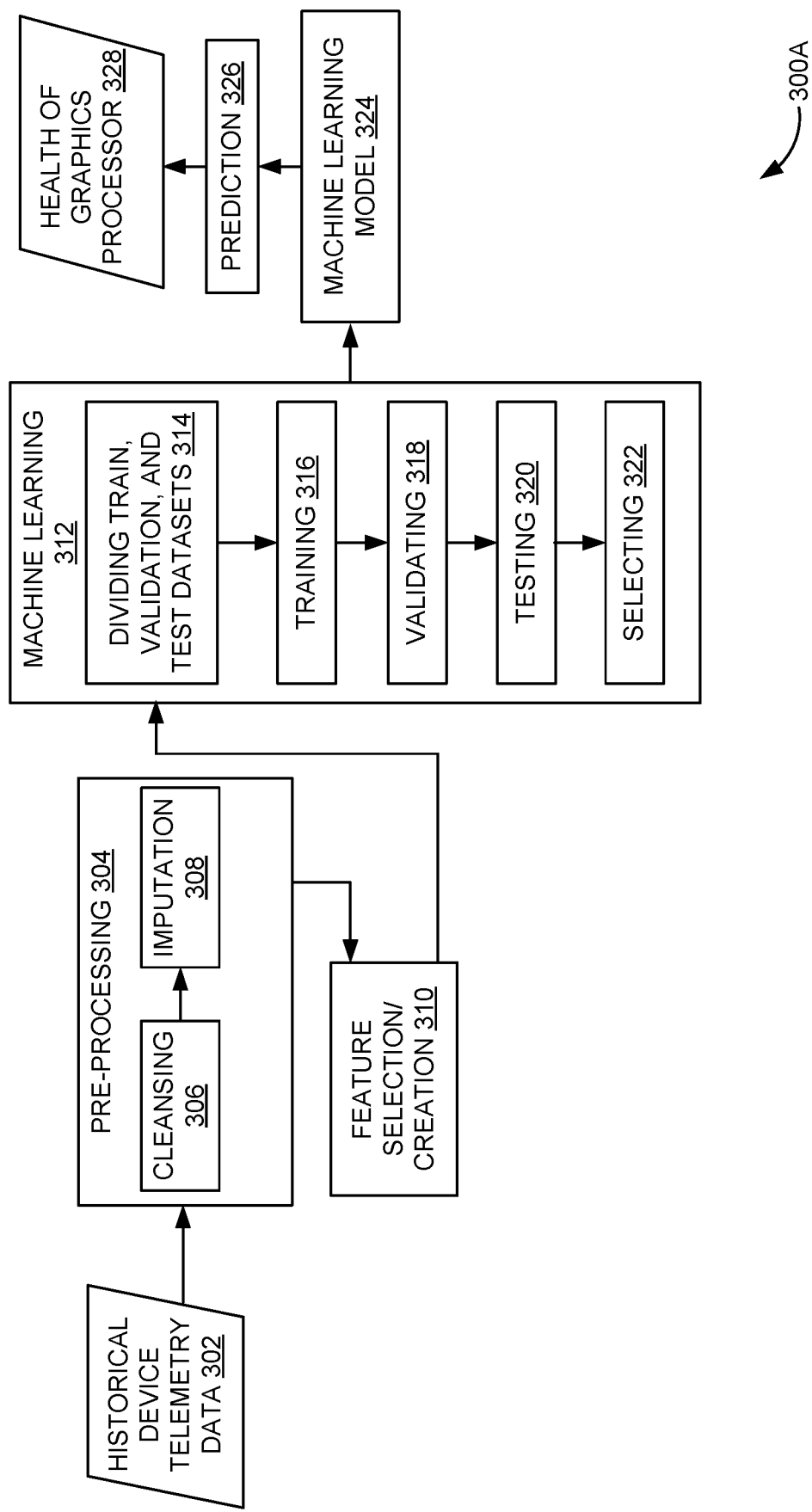
FIG. 3A is a flowchart illustrating an example process for training a machine learning model based on historical device telemetry data.

FIG. 3A is a flowchart illustrating an example process 300A for training a machine learning model 324 based on historical device telemetry data 302. In an example, process 300A is implemented in a computing device (e.g., a cloud-based server). At 304, historical device telemetry data 302 associated with an electronic device may be received from the electronic device. In other example, historical device telemetry data 302 associated with multiple electronic devices can be received and utilized to build machine learning model 324.

Further at 304, historical device telemetry data 302 may be pre-processed. In an example, pre-processing historical device telemetry data 302 includes cleansing the data (e.g., at 306), imputing the data (e.g., at 308), or any combination thereof. In an example, cleansing the data includes detecting and replacing an outlier value of a variable in historical device telemetry data 302. In another example, cleansing the data includes normalizing a value of a variable in historical device telemetry data 302. Further, historical device telemetry data 302 may be imputed for any missing data value, invalid data value, or scaling a data value. In this example, missing or invalid data values can be processed to impute values to replace the missing or invalid data values. In other words, historical device telemetry data 302 may be imputed to insert estimates for missing values that may have minimal impact on the analysis method. For example, historical device telemetry data 302 may be imputed through different statistical processes such as mean, previous entry, next entry, automated method (e.g., mice in R), and the like.

Further, at 310, a set of features (e.g., feature vectors) with a plurality of parameters (e.g., that are capable of being used to train the set of machine learning models) may be selected or generated from the pre-processed historical device telemetry data. In an example, a feature selecting algorithm such as Boruta is used to select the set of features. At 312, machine learning model 324 may be built with the cleansed and imputed data with the selected feature vectors. In an example, machine learning model 324 is built as described in blocks 314, 316, 318, 320, and 322. At 314, the cleansed and imputed data may be divided into training data, validation data, and test data. For example, the cleansed and imputed data is divided into 60% of training data, 20% of validation data, and 20% of test data. In other words, first 60% entries may be provided as the training data, next 20% entries may be provided as the validation data, and last 20% entries may be provided as the test data.

At 316, multiple machine learning models may be built with 60% training data. At 318, the machine learning models may be validated with 20% validation data. In an example, the machine learning models are tuned based on the validation. At 320, upon validating the machine learning models, the machine learning models may be tested with 20% test data.

At 322, machine learning model 324 having a high accuracy may be selected from the trained and tested machine learning models. In some examples, selected machine learning model 324 can be stored in a low latency database. The low latency database may facilitate in querying of stored machine learning model 324 with minimal delay (i.e., minimum latency), for instance, via a representational state transfer (REST) application programming interface (API). At 326, selected machine learning model 324 may be applied on real-time device telemetry data received from the electronic device to predict health of the graphic processor (i.e., as shown in block 328) of the electronic device. An example process to predict the health of the graphic processor is described in FIG. 3B.

Figure 3B:
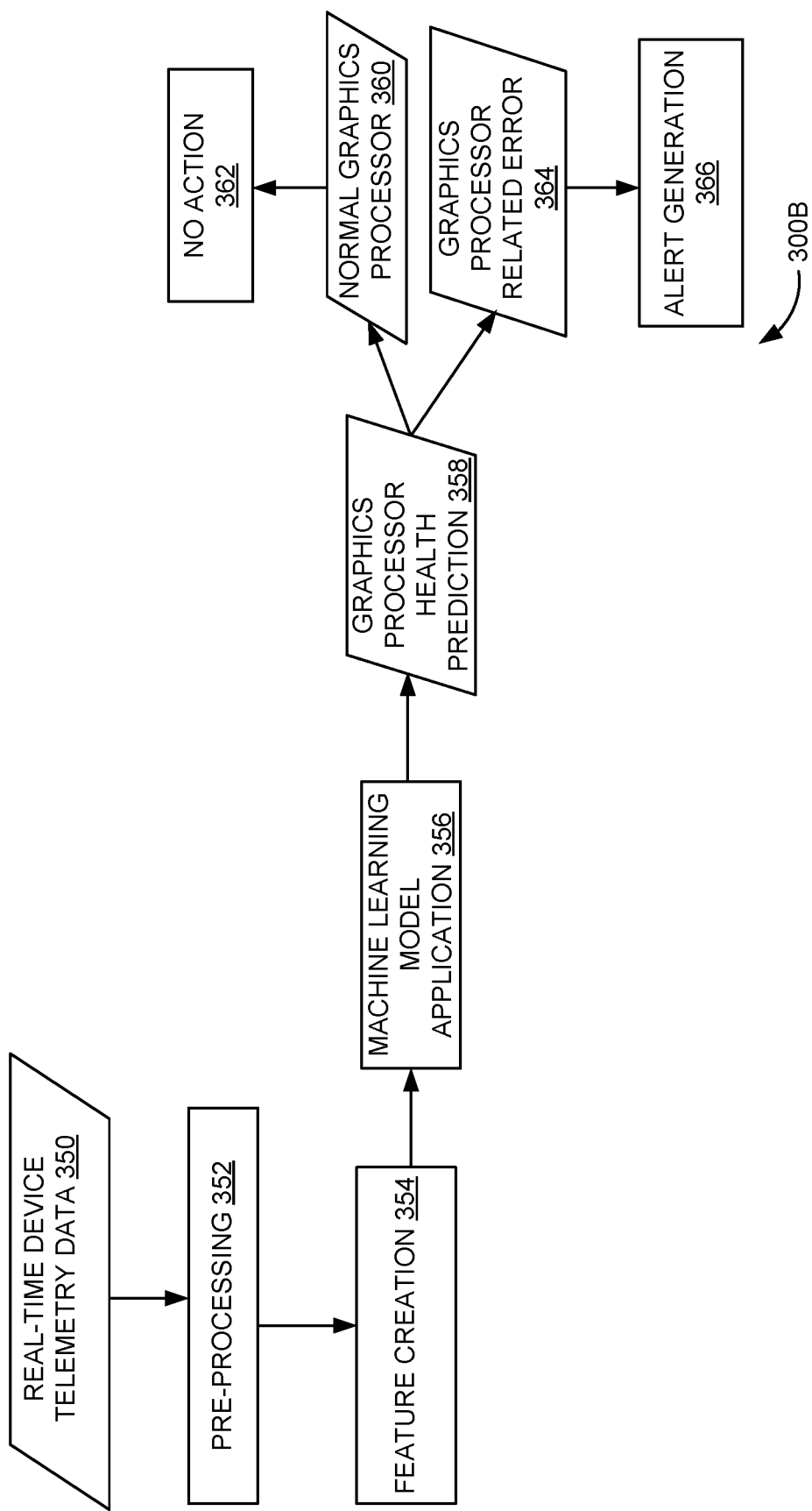
FIG. 3B is a flowchart illustrating an example process for predicting a health of a graphics processor by applying the trained machine learning model (e.g., of FIG. 3A) on real-time device telemetry data.

FIG. 3B is a flowchart illustrating an example process 300B for predicting the health of the graphics processor of the electronic device by applying trained machine learning model (e.g., machine learning model 324 of FIG. 3A) on real-time device telemetry data 350. In the example shown in FIG. 3B, process 300B may be implemented in a computing device (e.g., a cloud-based server). At 352, real-time device telemetry data 350 for a period may be received from the electronic device and received real-time device telemetry data 350 may be pre-processed. In an example, a client code executing in the electronic device collects real-time device telemetry data 350 and provides the collected device telemetry data 350 to the computing device. Further, pre-processing real-time device telemetry data 350 may include cleansing the data, imputing the data, or any combination thereof. Example device telemetry data is depicted in table 1.

TABLE 1

| GPU error indicator | GPU clock | GPU usage | double bit ECC error | Video engine utilization | RAM size | RAM utilization | Number of applications | CPU usage |
|---|---|---|---|---|---|---|---|---|
| 1 | 1830 | 70 | 1 | 10 | 8 | 92 | 35 | 89 |
| 1 | 200 | 68 | 1 | 7 | 8 | 88 | 32 | 82 |
| 0 | 200 | 55 | 0 | 3 | 16 | 75 | 40 | 71 |
| 0 | 300 | 100 | 0 | 2 | 16 | 72 | 38 | 65 |

In the example table 1, the device telemetry data may include information associated with GPU clock, GPU usage, double bit ECC error, video engine utilization, random access memory (RAM) size, ECC status, RAM utilization, number of applications installed/used, CPU usage, and the like. Also, table 1 depicts a GPU error indicator corresponding to different values associated with the device telemetry data. The GPU error indicator may be set as GPU normal/

GPU error for GPU relater errors. In other examples, the GPU error indicator value of "0" may indicate a normal GPU and the GPU error indicator value of "1" may indicate a GPU error.

At 354, a set of features is created/selected for the pre-processed data. Example features (e.g., GPU clock, GPU utilization, and double bit ECC errors) selected from the pre-processed data of table 1 is depicted below in table 2.

TABLE 2

| GPU clock | GPU utilization | double bit ECC errors |
|---|---|---|
| 1830 | 70 | 1 |
| 220 | 100 | 0 |

At 356, machine learning model 324, as selected at block 322 of FIG. 3A, is applied to the device telemetry data to:
- predict the health of the graphics processor (e.g., as shown in block 358) by analyzing the real-time device telemetry data, and
- generate an alert notification when the predicted health indicates an error associated with the graphics processor.

In an example, the real-time device telemetry data is analyzed by comparing the real-time device telemetry data with benchmark data to determine the health of the graphics processor. For example, the benchmark data includes data indicating a defined quantitative quality standard. When the benchmark data is defined, the real-time device telemetry data can be measured against the benchmark data to predict the graphics processor related error. An example real-time device telemetry data and corresponding recommended data including a corrective action are depicted in tables 3 and 4, respectively.

TABLE 3

| GPU clock | GPU utilization | double bit ECC error | Video engine utilization | RAM size | ECC status | RAM utilization | Number of applications | CPU utilization |
|---|---|---|---|---|---|---|---|---|
| 200 | 68 | 1 | 7 | 8 | 1 | 88 | 32 | 82 |

TABLE 4

| GPU clock | GPU utilization | double bit ECC error | Video engine utilization | RAM size | ECC status | RAM utilization | Number of applications | CPU utilization |
|---|---|---|---|---|---|---|---|---|
| 200 | 68 | 1 | 7 | 16 | 1 | 88 | 32 | 82 |

In the example table 4, the corrective action indicates that RAM size has to be increased from 8 GB to 16 GB. In some examples, when the predicted health is normal (i.e., when no error is determined, as shown in block 360), no action is initiated, at 362. In other examples, when the predicted health indicates a GPU related error (e.g., as shown in block 364), an alert notification including the corrective action (e.g., as depicted in table 4) to correct the error is generated and sent to the electronic device, at 366.

In the examples described herein, the electronic device may make a REST API call at frequent intervals or at a new user login to the electronic device. Upon receiving the REST API call, the computing device may obtain the real-time device telemetry data from the electronic device. Further, the computing device may communicate with the low latency database, via an API call, for predicting the health of the graphics processor. Furthermore, the estimated results with suggested actions and measures to correct the error related to the graphics processor obtained from the low-latency database may be prompted back to the electronic device. In an example, the corrective actions due to the impact of the errors can be configured in another database or metadata may be retrieved or mapped based on the health of the graphics processor predicted by machine learning model 324 based on rule-based approach and prompted to user as necessary. Thus, examples described herein may enable to build an artificial intelligence driven alert mechanism to predict and prompt users to correct the graphics processor related errors.

The processes depicted in FIGS. 3A and 3B represent generalized illustrations, and those other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

Figure 4:
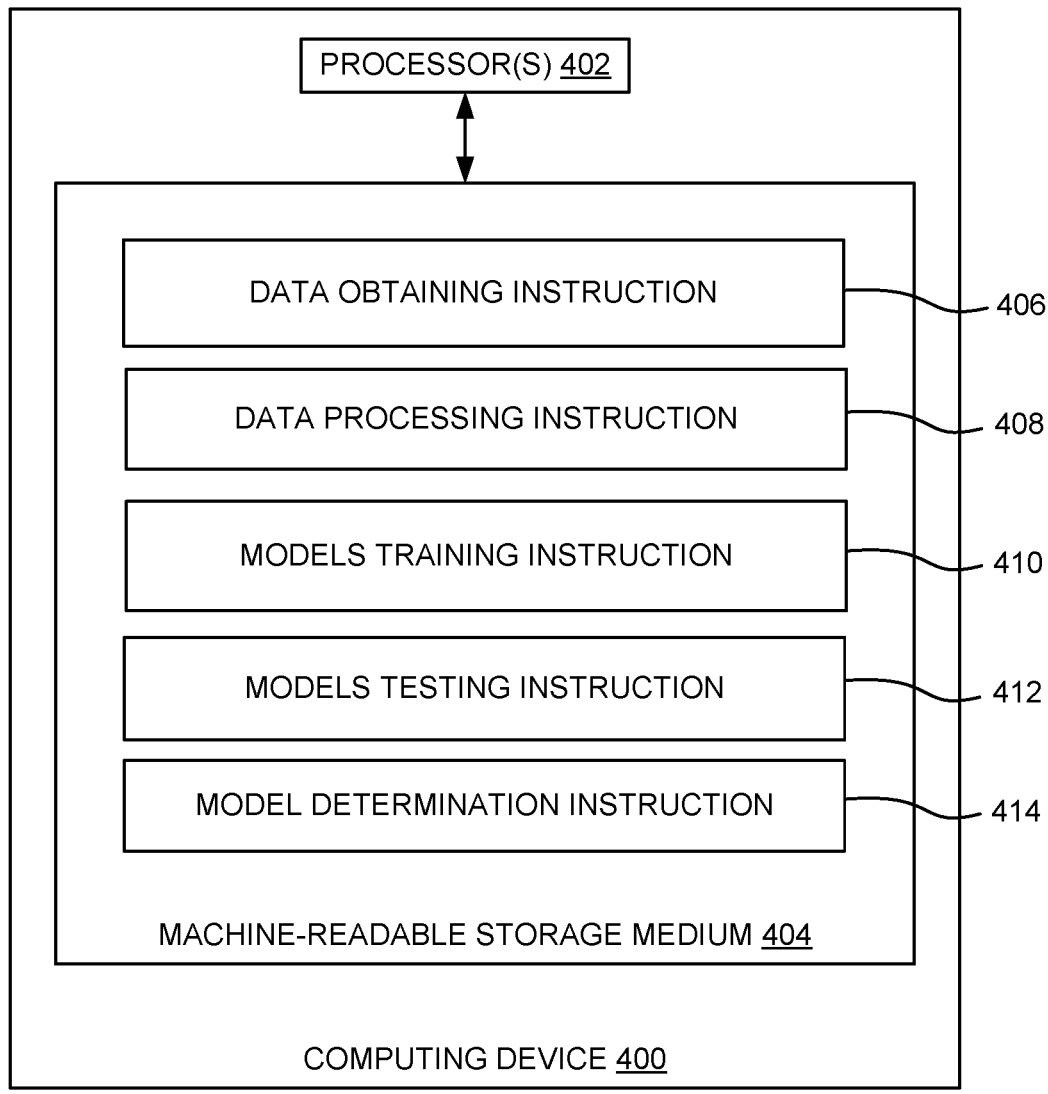
FIG. 4 is a block diagram of an example computing device including a non-transitory machine-readable storage medium, storing instructions to determine a machine learning model to predict health of a graphics processor of an electronic device.

FIG. 4 is a block diagram of an example computing device 400 including a non-transitory machine-readable storage medium 404, storing instructions to determine a machine learning model to predict health of a graphics processor of an electronic device. Computing device 400 includes a processor 402 and machine-readable storage medium 404 communicatively coupled through a system bus. Processor 402 may be any type of central processing unit (CPU), microprocessor, or processing logic that interprets and executes machine-readable instructions stored in machine-readable storage medium 404.

Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), Rambus® DRAM (RDRAM), Rambus® RAM, and the like, or storage memory media such as a floppy disk, a hard disk, a CD-ROM, a DVD, a pen drive, and the like. In an example, machine-readable storage medium 404 may be a non-transitory machine-readable medium, where the term "non-transitory" does not encompass transitory propagating signals. In an example, machine-readable storage medium 404 may be remote but accessible to computing device 400.

Machine-readable storage medium 404 stores instructions 406, 408, 410, 412, and 414. Instructions 406 may be executed by processor 402 to obtain historical device telemetry data of the electronic device. In this example, the historical device telemetry data associated with multiple components of the electronic device is obtained over a period. For example, the historical device telemetry data includes historical graphics processor data and historical device usage data. The historical graphics processor data may include graphics processor identification data, graphics processor usage data, graphics processor monitoring data, graphics processor setting data, graphics processor driver data, or any combination thereof. The historical device usage data may include application usage data, operating system data, memory usage data, or any combination thereof.

Instructions 408 may be executed by processor 402 to process the historical device telemetry data to generate a train dataset and a test dataset. In an example, instructions to process the historical device telemetry data include instructions to:
- correlate the historical graphics processor data with the historical device usage data, and
- generate the train dataset and the test dataset based on the correlation.

In an example, the historical graphics processor data is correlated in a time series with the historical device usage data to identify historical graphics processor data values corresponding to historical device usage data values. For example, historical ECC error data is correlated in a time series with the historical GPU usage data and the application usage data to identify an occurrence of a single bit ECC error or a double bit ECC error corresponding to an amount of the GPU usage and the number of concurrent running applications. Instructions 410 may be executed by processor 402 to train a set of machine learning models to estimate health of a graphics processor of the electronic device using the train dataset.

Instructions 412 may be executed by processor 402 to test the trained set of machine learning models with the test dataset. In an example, prior to testing the trained set of machine learning models, machine-readable storage medium 404 stores instructions to validate the trained machine learning models to tune an accuracy of the trained machine learning models based on a validation dataset of the processed historical device telemetry data. Thus, a feedback mechanism through the test dataset and the validation dataset can be built to confirm the correctness of the machine learning models and fine tune the accuracy of the machine learning models, respectively.

Instructions 414 may be executed by processor 402 to determine a machine learning model from the set of tested machine learning models to predict, in real-time, the health of the graphics processor. In an example, instructions to determine the machine learning model from the set of tested machine learning models to predict the health of the graphics processor include instructions to determine the machine learning model having a maximum accuracy from the set of tested machine learning models to:
- determine a condition of the electronic device that triggers a graphics processor related error using real-time device telemetry data. The real-time device usage data may include data that affects a performance of a graphics processor of the electronic device.
- predict the health of the graphics processor corresponding to the determined condition.

Further, machine-readable storage medium 404 may store instructions to:
- receive real-time device telemetry data associated with the electronic device,
- predict the health of the graphics processor by analyzing the real-time device telemetry data using the determined machine learning model,
- generate an alert notification when the predicted health indicates an error associated with the graphics processor, and
- send the alert notification to the electronic device.

Figure 5:
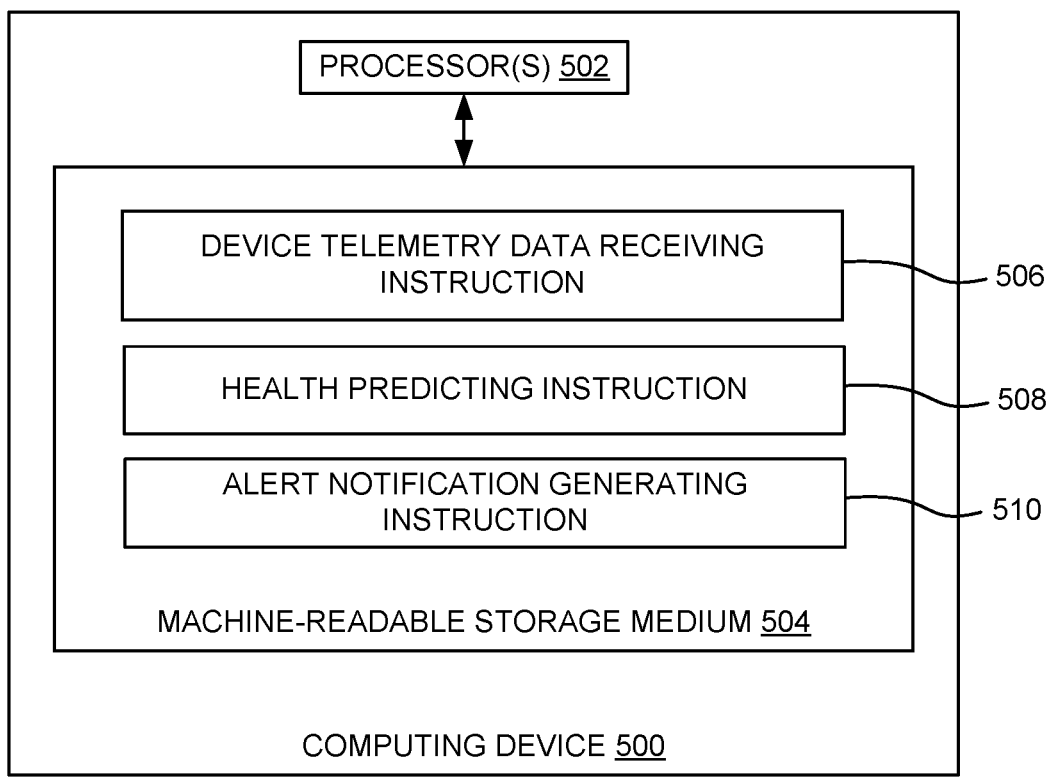
FIG. 5 is a block diagram of an example computing device including a non-transitory machine-readable storage medium, storing instructions to predict health of a graphics processor associated with an electronic device.

FIG. 5 is a block diagram of an example computing device 500 including a non-transitory machine-readable storage medium 504, storing instructions to predict health of a graphics processor associated with an electronic device. In an example, computing device 500 may be a server operating in a cloud computing system, a server configured in a Software as a Service (SaaS) architecture, or the like. An example electronic device may be a desktop computer, a laptop computer, a point-of-sale system, a smartphone, or the like.

Further, computing device 500 may be communicatively connected to the electronic device via a network. Example network can be a managed Internet protocol (IP) network administered by a service provider. For example, the network may be implemented using wireless protocols and technologies, such as Wi-Fi, WiMax, and the like. In other examples, the network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet, or other suitable network system and includes equipment for receiving and transmitting signals.

Computing device 500 includes a processor 502 and machine-readable storage medium 504 communicatively coupled through a system bus. Processor 502 may be any type of central processing unit (CPU), microprocessor, or processing logic that interprets and executes machine-readable instructions stored in machine-readable storage medium 504.

Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, and the like, or storage memory media such as a floppy disk, a hard disk, a CD-ROM, a DVD, a pen drive, and the like. In an example, machine-readable storage medium 504 may be a non-transitory machine-readable medium, where the term "non-transitory" does not encompass transitory propagating signals. In an example, machine-readable storage medium 504 may be remote but accessible to computing device 500.

Machine-readable storage medium 504 stores instructions 506, 508, and 510. Instructions 506 may be executed by processor 502 to receive device telemetry data associated with the electronic device. In an example, the device telemetry data is received at a periodic interval or in response to a user login event to the electronic device (e.g., when a user logs in to the electronic device). Further, computing device 500 may receive the device telemetry data of the electronic device via an API call, for instance.

In an example, the device telemetry data includes data that affects a performance of the graphics processor of the electronic device. For example, the device telemetry data includes device usage data and graphics processor data. The device usage data may include central processing unit (CPU) usage data, application installation data, memory usage data, decoder utilization data, encoder utilization data, device health data, operating system data, or any combination thereof. The graphics processor data may include graphics processor usage data, graphics processor identification data, graphics processor temperature data, error checking and correcting (ECC) error data, graphics processor settings data, graphics processor driver data, or any combination thereof.

Instructions 508 may be executed by processor 502 to predict health of the graphics processor by applying a machine learning model to the device telemetry data. In an example, instructions to predict the health of the graphics processor include instructions to apply the machine learning model to the telemetry data to predict the health of the graphics processor by comparing the received telemetry data with benchmark data for the electronic device. For example, instructions to predict the health of the graphics processor include instructions to:
 correlate the graphics processor data with the device usage data, and
 predict the health of the graphics processor by applying the machine learning model to the telemetry data based on the correlation.

For example, the graphics processor data may be correlated in time with the device usage data, for instance, to identify the graphics processor data corresponding to the device usage data. Instructions 510 may be executed by processor 502 to generate an alert notification based on the predicted health of the graphics processor. In an example, the alert notification includes a corrective action to mitigate an impact of a device condition on the health of the graphics processor. In an example, a set of corrective actions (e.g., recommended approaches and measures) can be configured in computing device 500 (e.g., in a storage device associated with computing device 500). Further, the set of corrective actions may be mapped to different types of graphics processor related errors based on a rule-based approach, for instance. In this example, the corrective action may be determined from the set of corrective actions based on a type of graphics processor related error. Further, the alert notification may be sent to the electronic device when the predicted health indicates an error associated with the graphics processor.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A non-transitory machine-readable storage medium encoded with instructions that, when executed by a processor of a computing device, cause the processor to:
 receive device telemetry data associated with an electronic device, wherein the device telemetry data comprises data that affects a performance of a graphics processor of the electronic device;
 predict health of the graphics processor by applying a machine learning model to the device telemetry data; and
 generate an alert notification based on the predicted health of the graphics processor.

2. The non-transitory machine-readable storage medium of claim 1, wherein instructions to predict the health of the graphics processor comprise instructions to:
 apply the machine learning model to the telemetry data to predict the health of the graphics processor by comparing the received telemetry data with benchmark data for the electronic device.

3. The non-transitory machine-readable storage medium of claim 1, wherein the device telemetry data comprises device usage data and graphics processor data.

4. The non-transitory machine-readable storage medium of claim 3, wherein the device usage data comprises central processing unit (CPU) usage data, application installation data, memory usage data, decoder utilization data, encoder utilization data, device health data, operating system data, or any combination thereof, and wherein the graphics processor data comprises graphics processor usage data, graphics processor identification data, graphics processor temperature data, error checking and correcting (ECC) error data, graphics processor settings data, graphics processor driver data, or any combination thereof.

5. The non-transitory machine-readable storage medium of claim 3, wherein instructions to predict the health of the graphics processor comprise instructions to:
 correlate the graphics processor data with the device usage data; and
 predict the health of the graphics processor by applying the machine learning model to the telemetry data based on the correlation.

6. The non-transitory machine-readable storage medium of claim 1, wherein the alert notification is to include a corrective action to mitigate an impact of a device condition on the health of the graphics processor, and wherein the alert notification is sent to the electronic device when the predicted health indicates an error associated with the graphics processor.

7. A non-transitory machine-readable storage medium storing instructions executable by a processor of a computing device to:
   obtain historical device telemetry data of an electronic device, the historical device telemetry data comprising historical graphics processor data and historical device usage data, and wherein the historical device usage data comprises application usage data, operating system data, memory usage data, or any combination thereof;
   process the historical device telemetry data to generate a train dataset and a test dataset;
   train a set of machine learning models to estimate health of a graphics processor of the electronic device using the train dataset;
   test the trained set of machine learning models with the test dataset; and
   determine a machine learning model from the set of tested machine learning models to predict, in real-time, the health of the graphics processor.

8. The non-transitory machine-readable storage medium of claim 7, wherein the historical graphics processor data comprises graphics processor identification data, graphics processor usage data, graphics processor monitoring data, graphics processor setting data, graphics processor driver data, or any combination thereof.

9. The non-transitory machine-readable storage medium of claim 7, further comprising instructions to:
   receive real-time device telemetry data associated with the electronic device;
   predict the health of the graphics processor by analyzing the real-time device telemetry data using the determined machine learning model;
   generate an alert notification when the predicted health indicates an error associated with the graphics processor; and
   send the alert notification to the electronic device.

10. The non-transitory machine-readable storage medium of claim 7, wherein instructions to determine the machine learning model from the set of tested machine learning models to predict the health of the graphics processor comprise instructions to:
   determine the machine learning model having a maximum accuracy from the set of tested machine learning models to:
      determine a condition of the electronic device that triggers a graphics processor related error using real-time device telemetry data, wherein the real-time device usage data comprises data that affects a performance of a graphics processor of the electronic device; and
      predict the health of the graphics processor corresponding to the determined condition.

11. The non-transitory machine-readable storage medium of claim 7, further comprising instructions to:
   prior to testing the trained set of machine learning models, validate the trained machine learning models to tune an accuracy of the trained machine learning models based on a validation dataset of the processed historical device telemetry data.

12. The non-transitory machine-readable storage medium of claim 7, wherein instructions to process the historical device telemetry data comprise instructions to:
   correlate the historical graphics processor data with the historical device usage data; and
   generate the train dataset and the test dataset based on the correlation.

13. An electronic device comprising:
   a storage device;
   an output device; and
   a processor to:
      retrieve, from the storage device, device telemetry data for a period in response to receiving a trigger event, wherein the device telemetry data comprises graphics processor related data, application usage data, and error checking and correcting (ECC) error data;
      apply a machine learning model to the device telemetry data to:
         determine a condition of the electronic device that triggers a graphics processor related error; and
         when the determined condition indicates the graphics processor related error, retrieve a corrective action corresponding to the determined condition to mitigate the graphics processor related error; and
      output an alert notification including the corrective action via the output device.

14. The electronic device of claim 13, wherein the graphics processor related data comprises graphics processor usage data, graphics processor identification data, graphics processor temperature data, graphics processor settings data, graphics processor driver data, or any combination thereof, and wherein the ECC error data comprises single bit ECC error data, double Bit ECC Error data, or a combination thereof.

15. The electronic device of claim 13, wherein the processor is to:
   correlate, in time-series, the graphics processor data, application usage data, and ECC error data; and
   determine the condition of the electronic device that triggers the graphics processor related error by applying the machine learning model to the device telemetry data based on the correlation, wherein the graphics processor related error comprises a single bit ECC error, a double Bit ECC Error, a temperature of the graphics processor exceeding a threshold, or any combination thereof.

* * * * *